Aug. 14, 1934.   H. E. IVES   1,970,311
PROJECTION OF IMAGES FOR VIEWING IN STEREOSCOPIC RELIEF
Filed Feb. 14, 1931    2 Sheets-Sheet 2

INVENTOR
*H. E. IVES*
BY
*Stanley B. Kent*
ATTORNEY

Patented Aug. 14, 1934

1,970,311

UNITED STATES PATENT OFFICE 1,970,311

PROJECTION OF IMAGES FOR VIEWING IN STEREOSCOPIC RELIEF

Herbert E. Ives, Montclair, N. J., assignor to Bell Telephone Laboratories, Incorporated, New York, N. Y., a corporation of New York Application February 14, 1931, Serial No. 515,659

9 Claims. (Cl. 88—16.6)

This invention relates to the producing of pictures in stereoscopic relief and more particularly to the projection of pseudoscopic parallax panoramagram images to produce pictures to be viewed in stereoscopic relief.

An object of the invention is to provide an arrangement for projecting pseudoscopic strip images of an object for viewing in stereoscopic relief.

Another object of the invention is to provide an arrangement for viewing pictures in stereoscopic relief from projected pseudoscopic parallax panoramagram pictures, the stereoscopic effect being present when the projected pictures are viewed at different angles and at different distances without the use of any instrument at the observer's eyes.

A feature of the present invention is a projection system employing a picture film, on which are photographed a number of pseudoscopic parallax panoramagram pictures, and a ridged light diffusion screen for receiving the projected film pictures, the screen having the property of utilizing the pseudoscopic effect so that stereoscopic pictures in relief are seen by an observer viewing the screen.

In one arrangement illustrative of the invention, the viewing is accomplished by use of reflected light in which the reflection takes place from the front surfaces of the screen. It is a characteristic of the projection system employed that a single projector is used, and a further characteristic that the parallax panoramagram picture being projected must be of the pseudoscopic type, such as is produced by using a large lens in the taking apparatus. The screen comprises a plurality of cylindrical rod-shaped elements arranged side by side, each element having its convex front surface covered with a light reflecting material. The front surface of each reflecting element is ridged by a number of horizontal corrugations of a type to deflect the incident light rays upward and downward. For the production of stereoscopic motion pictures a motion picture machine is employed to project a series of pseudoscopic parallax panoramagram images on the front ridged corrugated reflecting surface of the screen. The light rays incident along the line joining the projector and the center axis of each of the rods of the screen are reflected back along their paths of projection, except for vertical diffusion caused by the horizontal corrugations on the front surface of the rods. The elementary strip images which fall to either side of the normal are, however, reflected back at increasing angles depending upon their distance from this normal. If the paths of the reflected rays are traced back into the body of the rods, it will be found that they virtually originate at a point approximately halfway to the center of the rod, that is, they cross at a point approximately halfway between the front surface of the rod and its center axis. The apparent origin of these reflected rays is in reality a virtual image of the projector lens, the apparent brightness of which, as viewed from different positions within the viewing space, is dependent upon the tone values of the strips of the projected panoramagram. In consequence of this disposition of the rays, the pseudoscopic parallax panoramagram image which is projected on the front surface of the rods will appear as though standing in front of a grating of narrow, transparent lines situated at the virtual crossing or apparent origin of the reflected rays. This causes the projected pictures to appear in stereoscopic relief to observers viewing the front of the screen. The grating referred to is of the type disclosed in the paper entitled "Parallax Panoramagrams Made with a Large Diameter Lens" by H. E. Ives, published in the June 1930 issue of the Journal of the Optical Society of America, beginning on page 332.

Another type of projection screen also illustrative of the invention uses, in place of the rods with front convex cylindrical reflecting surfaces, a transparent sheet having a ridged surface formed by concave cylindrical grooves. This sheet may be made of any suitable transparent material, such as glass or celluloid, on one side of which the concave cylindrical grooves are formed. To employ such a screen for viewing stereoscopic pictures in relief, images of the pseudoscopic parallax panoramagram strips are projected from a distant lens upon the rear flat surface of the transparent screen and brought to a focus on the front ridges of the screen, each set of strips being in register with a concave element. After emerging from the front of the screen the projected light rays diverge and appear to originate from points which are virtual images of the projection lens located a short distance behind the concave surface. An observer viewing the screen from the side of the concave ridges sees pictures in stereoscopic relief.

An advantage of these virtual image types of screens is that in each case the negative making operation for producing the pseudoscopic parallax panoramagram may require only a relatively short single exposure and be performed with apparatus involving no moving parts. The parallax panoramagram pictures for use with such a screen may be made in either one of two ways. Either a large lens is employed to project images of an object through an opaque line grating upon a sensitive plate back of the grating in the manner disclosed in the H. E. Ives publication supra; or the negative may be made by using a large lens to focus an image of an object upon the front of a translucent diffusion screen of the type disclosed in Patent No. 1,883,290 of H. E. Ives, patented October 18, 1932, the infinity of strip images of the object formed on the rear of the translucent screen being photographed from the rear of the screen, in reduced size, upon a moving picture film by means of a short focus lens. The images formed on this film are of the pseudoscopic parallax panoramagram type, which however appear in stereoscopic relief to an observer viewing the screen when these images are projected upon either of the virtual image types of viewing screens described above.

The invention will now be described more in detail having reference to the accompanying drawings.

Figs. 4 and 4A are detail showings, respectively, of top and front views of the viewing screen shown in Fig. 2;

Figs. 5 and 5A are detail showings, respectively, of top and front views of the viewing screen shown in Fig. 3;

Identical elements in the different figures are represented by like reference characters.

Figure 1:
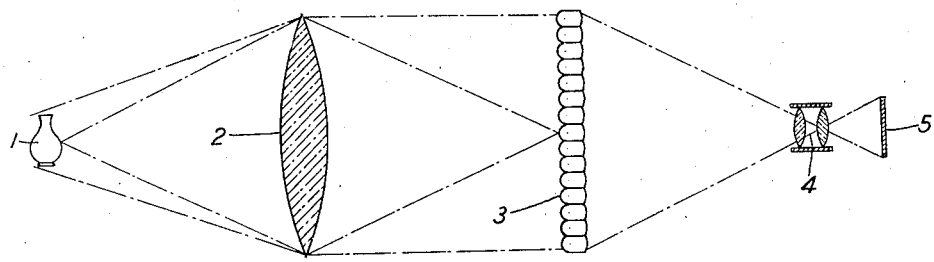
Fig. 1 is a diagrammatic showing of one arrangement for taking pseudoscopic parallax panoramagram pictures.

Referring now to Fig. 1, a large diameter lens 2 is positioned in such a manner that it forms an image of an object 1, on the front ridged surface of a lenticular shaped translucent light diffusing screen 3. This image is photographed from the rear of the screen 3 upon a moving picture light sensitive film 5, by means of the short focus photographic lens 4. If the lens 2 is large enough to give sufficiently widely separated points of view of the object 1, it will be ordinarily of such long focus that its image will be very much larger than a motion picture film frame. Such is the case illustrated in Fig. 1. This difficulty is overcome by photographing from the rear of the screen down to the required motion picture frame size the image formed by the large lens 2 on the translucent screen 3. This is done by means of the short focus lens 4 as described above.

The image produced upon the film 5 is of the pseudoscopic parallax panoramagram type; that is, the film record consists of an infinity of strip images, corresponding to those formed on the rear of the ridged translucent screen 3 and photographed by the lens 4. This infinity of strip images is formed from the single composite image on the front of the screen by means of the series of convex cylindrical lenses comprising the ridged screen and these images are transposed right for left due to the pseudoscopic action of the large lens 2.

If the pictures produced upon the film 5 must be taken with the speed necessary for motion picture projection, it is essential to have some taking apparatus, which will make each film frame at a single exposure, and preferably the apparatus should have no moving parts. The large diameter lens 2 and the ridged translucent screen 3 in front of the film 5 serve as efficient apparatus for this purpose. As already noted, however, the resulting pictures are of the pseudoscopic parallax panoramagram type. One means of utilizing this pseudoscopic parallax panoramagram picture in the projection of images to be viewed in stereoscopic relief is illustrated by the projection apparatus shown in Fig. 2.

Figure 2:
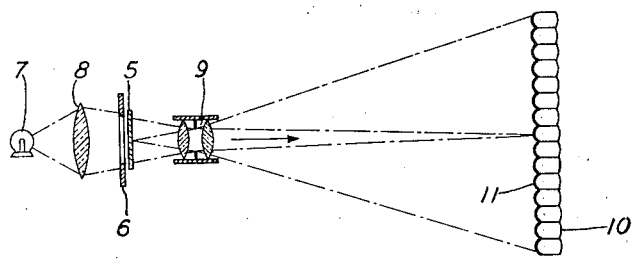
Fig. 2 is a diagrammatic showing of one arrangement for the projection of pseudoscopic parallax panoramagram pictures.

Referring now to Fig. 2, the pseudoscopic parallax panoramagram film 5, produced by the taking apparatus of Fig. 1, is positioned in front of an apertured screen 6, light collecting lens 8, and a source of light 7. The pseudoscopic parallax panoramagram picture on the film 5 is of the type disclosed in the paper entitled "Parallax Panoramagrams Made with a Large Diameter Lens" by H. E. Ives, supra. In front of the film 5 and positioned at a suitable distance for viewing, is a ridged light reflecting screen 10. Interposed between the film 5 and screen 10 is a projection lens 9. For projection of stereoscopic pictures in relief, the incandescent light source 7 illuminates the lens 8 which directs the light to give a uniform illumination on the back of one frame of the motion picture film 5 which is moved downward in an intermittent manner in front of the apertured screen 6. The projection lens 9 is of such defining power that it images the panoramic strips of the pseudoscopic parallax panoramagram film 5 accurately into coincidence with the front ridged surface 11 of the screen 10. The construction of the screen 10 is such that the pseudoscopic parallax panoramagram images projected upon it appear as stereoscopic motion pictures in relief to an observer viewing the screen in the direction of the arrow. This correct relief effect is due to the fact that the projected parallax panoramagram strips appear as virtual images which originate within the reflecting elements of the screen and which have their elementary strips transposed in the correct manner.

Figure 4:
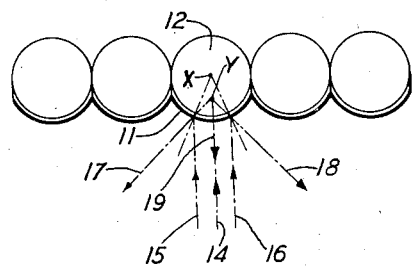
Figure 4:
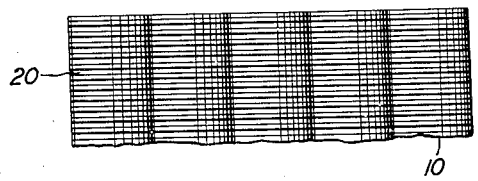

The detailed structure of the screen 10 and its operation will be best understood from a consideration of Figs. 4 and 4A. The screen 10 is composed of a plurality of cylindrical rod-shaped elements 12 arranged side by side. The front convex surface 11 of each rod element is covered with an opaque light reflecting material, or the rods themselves may be made of an opaque reflecting material whose surface could be polished to reflect the incident light. The manner of reflection of light rays, projected from a pseudoscopic parallax panoramagram picture 5 such as shown in Fig. 2, upon the front surface 11 of the rod screen 10, is illustrated in Fig. 4, by means of the dotted lines. The light ray 14 incident normally on the axis of the rod 12 is reflected straight back along its path of projection as indicated by the dotted line 19. The light rays 15 and 16, representing strip images of the pseudoscopic parallax panoramagram film, which fall to either side of the normal are reflected off at increasing angles shown by reflected rays 17 and 18. The angle of reflection depends upon the distance between the normal and the incident rays. If the paths of the reflected rays 17, 18 and 19, are extended back into the rod 12, they appear to diverge from a point Y which is located half way between the axis X and the front surface 11 of the rod 12. The point Y is a virtual image of the projection lens 9, which is projecting strip images of the pseudoscopic parallax panoramagram 5. Actually during projection of the pseudoscopic parallax panoramagram picture as shown in Fig. 2 a plurality of these virtual images are formed one for each of the reflecting rods 12 which compose the screen 10. The formation of these virtual images has the advantage for our purpose that the projected panoramic strips appear transposed and are accordingly right way around for proper utilization of the pseudoscopic parallax panoramagram to produce steroscopic pictures in relief to an observer viewing the front of the screen. In order to see the relief picture projected on a screen made up of cylindrical light reflecting elements of this sort, it is necessary to provide for diffusion of the light in the direction parallel to the axis of the cylinders; otherwise merely a point of light, corresponding to the projection lens, will be seen. This diffusing means is provided for by horizontal corrugations extending across the entire front surface of each of the reflecting rods. This ribbed type of surface is shown at 20 in Fig. 4A. These horizontal corrugations run at right angles to the axis of the cylindrical rods. They may, however, be only approximately at right angles to the axis of the rods, for example, like the threads formed upon a machine screw with a slight pitch.

Figure 6:
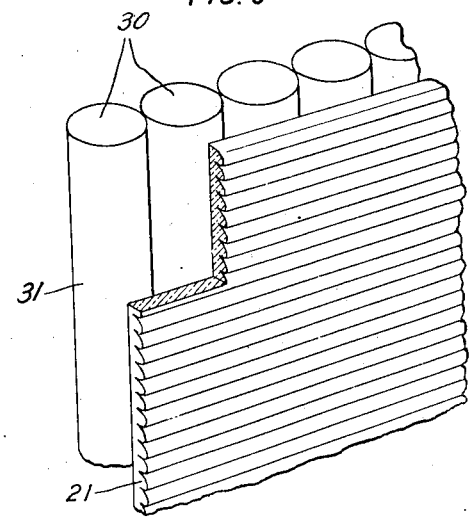
Fig. 6 is a detail perspective showing of a modification of the apparatus shown in Figs. 4 and 4A.

A modification of the viewing screen described above is shown in perspective in Fig. 6. Here instead of forming the horizontal corrugations on the front surface of the rod reflecting elements 30 they are formed on a sheet of glass or like transparent material 21, which is placed directly in front of the rod screen. In this case the front reflecting surface 31 of the rods is not ribbed with the horizontal corrugations 20, otherwise the structure of the screen is the same as shown in Figs. 4 and 4A. When this type of screen is employed in a projection system such as shown in Fig. 2, the light rays from the pseudoscopic parallax panoramagram film 5 are transmitted and diffused upward and downward by this sheet of ribbed transparent material 21.

Figure 7:
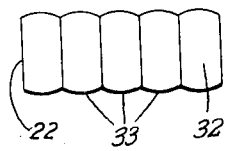
Fig. 7 is a detail showing of a modification of the apparatus in Fig. 4.

A modification of the structure of the cylindrical rod-shaped reflecting elements 12, shown in Fig. 4, is illustrated in Fig. 7. Owing to the laws of reflection, the angle through which the picture is displayed is twice the angle of the circumference on which the strip images fall. A negative, made with an apparatus viewing its object through an angle of 60 degrees, must thus be projected upon strips of these cylinders of only 30 degrees extent. For this reason, complete half cylinders will ordinarily have considerable dead space. This may be obviated by cutting off the sides of the cylinders before they are mounted up together. A viewing screen made from a number of these reconstructed cylinders is shown in Fig. 7. It comprises a series of narrow, oblong shaped elements 32, having flat side surfaces 22 and front opaque mirror-like reflecting surfaces 33, the latter surfaces being of cylindrical curvature like the front surfaces 11 of the cylindrical rods 12 in Fig. 4 but having a much smaller angle of circumference upon which the strip images of the pseudoscopic parallax panoramagram picture are projected. The area of the front surfaces 33 in Fig. 7 is substantially smaller than the area of the front surfaces 11 of the cylindrical rods 12 in Fig. 4, the actual angular extent depending upon the angle from which the parallax panoramagram, to be projected was made. A parallax panoramagram without blank spaces between the sets of strips can therefore be used with the screen of Fig. 7.

Figure 8:
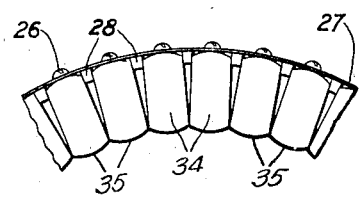
Fig. 8 is a detail showing of a modification of the apparatus in Fig. 7.

Fig. 8 shows a modified arrangement of the light reflecting screen in Fig. 7. In this arrangement the light reflecting elements 34 are fastened, by means of screws 26, upon a flexible plate 27 which is given a slight curvature about a vertical axis. The spacing members 28 permit movement of the elements 34 when the flexible plate 27 is bent. The viewing surface formed by this arrangement of the front reflecting surfaces 35 is thereby made slightly concave. This slightly concave surface structure serves as a means for directing the cones of light, from the elements far off the axis, around into the zone of observation; that is the light from the elemental portions of the parallax panoramagram projected on the peripheral portions of the screen is reflected back and in a direction toward the center axis of the screen into the zone of observation. This arrangement of the light reflecting elements is also applicable to the apparatus in Fig. 4. The amount of curvature of plate 27 in Fig. 8 is exaggerated for purposes of illustration.

Figure 3:
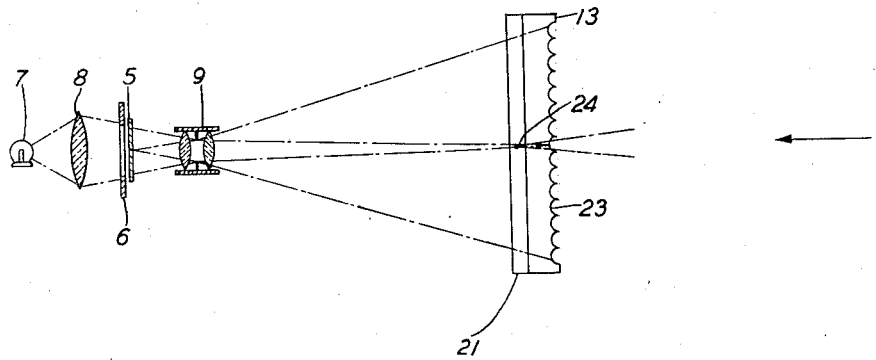
Fig. 3 is a diagrammatic view of a modification of the picture projecting apparatus of Fig. 2.

Another means for producing stereoscopic pictures in relief from projected pseudoscopic parallax panoramagram pictures is shown in Fig. 3. This differs from the projection system shown in Fig. 2, only in the type of viewing screen used. The viewing screen 10 in Fig. 2 operates by reflected light and is viewed from the side of the screen toward the projector as indicated by the arrow. The viewing screen 13 in Fig. 3 operates by transmitted light and is viewed from the side opposite the projector. For producing stereoscopic relief pictures according to Fig. 3, the pseudoscopic parallax panoramagram film 5 is uniformly illuminated on its entire rear surface by means of the incandescent light source 7, apertured screen 6, and condensing lens 8. The film 5 moves downward in an intermittent manner exposing through the apertured screen 6 one picture frame at a time. The lens 9 projects images of the pseudoscopic parallax panoramagram of the film 5 upon the viewing screen 13, each set of strips of the image being in register with one of the concave elements 23. Interposed between the projecting lens 9 and the screen 13 is a sheet of transparent material 21, made of glass or other suitable material. The sheet 21 has a series of horizontal ridges formed on its surface to give vertical diffusion of the light rays. These vertically diffusing horizontal ridges may be formed on the flat surface of the screen 13 thereby dispensing with the ribbed sheet 21. The panoramic strips projected from the film 5 are transmitted through the sheet 21 and through the screen 13. The light rays after emerging from the ridged front surface 23 of the screen 13 are divergent and appear to come from points 24 located back of the screen. These points 24 are virtual images of the projection lens 9. The brightness of these points depends upon the angle from which they are observed, which in turn is determined by the transmission of a linear element in the panoramic strip projected on the concave element. If, however, we investigate which linear elements are seen from any particular direction, we find that they are oppositely oriented from those which would be seen if the front structure of this translucent screen were convex instead of concave, that is, the screen can use directly the pseudoscopic parallax panoramagrams 5 made with a large lens such as shown in Fig. 1, and present to an observer's eyes viewing the concave surface 23, stereoscopic pictures in relief.

Figure 5:
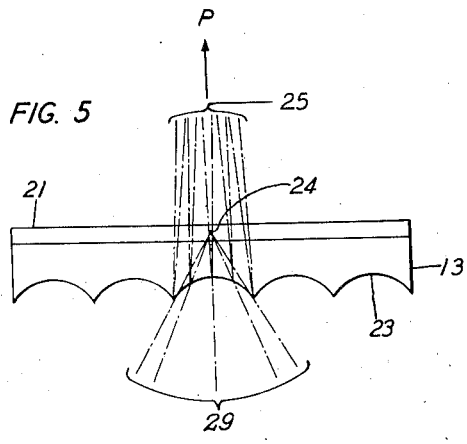
Figure 5:
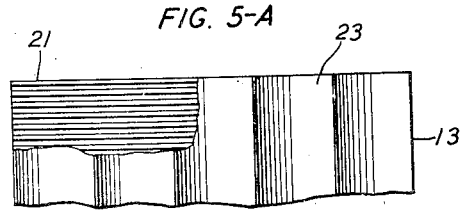

The structure of the screen 13 will be better understood from a consideration of the detail showing in Figs. 5 and 5A. The screen 13 consists of a sheet of transparent material such as glass or celluloid, one side of which has a smooth flat surface while the other side has a ridged surface formed by a series of concave cylindrical grooves 23. The vertically diffusing light transmitting plate 21 described above is placed back of the screen adjacent the flat surface of the screen. Fig. 5A shows a front view of the concave cylindrical grooves 23 with a portion broken away to show the ribbed light diffusing sheet 21 at the back. In Fig. 5 is shown a group of incident light rays 25 which represent the rays forming the strip images of the pseudoscopic parallax panoramagrams projected by the distant lens 9. These incident rays 25 are focussed as sharply as possible upon the rear curved surface of the concave grooves 23. On emerging from the front concave surface of these grooves, however, the incident rays diverge as shown by the dotted lines 29. The divergent rays appear to originate from the virtual image point 24. During projection, a panorama of these virtual points, which are virtual images of the projection lens, are formed back of the concave surface of the screen so that an observer viewing the screen from the side of the concave grooves sees stereoscopic pictures in relief.

The size of the elongated elements of the screens 3, 10 and 13 in Figs. 1, 2 and 3 are greatly exaggerated for the sake of clearness in drawing. The number and size of the elements is determined by the permissible coarseness of grain in the viewed images. The finer the grain, the greater must be the number and the smaller the size in proportion to the size of the whole image.

The scope of this invention is limited only by the appended claims.

What is claimed is:

1. In a system for producing pictures in stereoscopic relief, means for projecting pseudoscopic strip images of an object, and means upon which the projected pseudoscopic strip images are received and made visible in stereoscopic relief.

2. In a system for producing images for viewing in stereoscopic relief, means for projecting an image comprising sets of strips, each strip of a set corresponding to the appearance of an elemental portion of an object from a different point of view from that of another strip and the different sets representing different elemental portions, the strips of each set being pseudoscopically positioned, and means upon which said image is projected so constructed and arranged that an image of said object is made visible in sterostopic relief.

3. In a system for producing images for viewing in stereoscopic relief, means for projecting an image comprising sets of strips, each strip of a set corresponding to the appearance of an elemental portion of an object from a different point of view from that of another strip and the different sets representing different elemental portions, the strips of each set being pseudoscopically positioned, and a plurality of convex cylindrical mirror-like surfaces arranged side by side upon which said image is projected, the sets of strips registering with the convex surfaces respectively.

4. In a system for producing images for viewing in stereoscopic relief, means for projecting an image comprising sets of strips, each strip of a set corresponding to the appearance of an elemental portion of an object from a different point of view from that of another strip and the different sets representing elemental portions, the strips of each set being pseudoscopically positioned, and a plurality of plano-concave cylindrical lenticular elements arranged side by side upon the concave surfaces of which said image is projected through said elements, said projecting means being located on the plane side of the lenticular elements.

5. In a system for producing images for viewing in stereoscopic relief, means for projecting an image comprising sets of strips, each strip of a set corresponding to the appearance of an elemental portion of an object from a different point of view from that of another strip and the different sets representing different elemental portions, the strips of each set being pseudoscopically positioned, a plurality of convex cylindrical mirror-like surfaces arranged side by side upon which said image is projected, the sets of strips registering with the convex surfaces respectively, and means to diffuse elemental portions of the projecting beam in planes parallel to the axes of the cylindrical surfaces.

6. In a system for producing images for viewing in stereoscopic relief, means for projecting an image comprising sets of strips, each strip of a set corresponding to the appearance of an elemental portion of an object from a different point of view from that of another strip and the different sets representing different elemental portions, the strips of each set being pseudoscopically positioned, a plurality of plano-concave cylindrical lenticular elements arranged side by side 120 upon the concave surfaces of which said image is projected through said elements, said projecting means being located on the plane side of the lenticular elements, and means to diffuse elemental portions of the projecting beam in planes parallel to the axes of the cylindrical surfaces.

7. In a system for producing images for viewing in stereoscopic relief, means for projecting an image comprising sets of strips, each strip of a set corresponding to the appearance of an elemental portion of an object from a different point of view from that of another strip and the different sets representing different elemental portions, the strips of each set being pseudoscopically positioned, and means comprising a plurality of light deviating elements arranged side by side, upon which said image is projected, the sets of strips registering with said elements respectively and each element being so constructed and arranged as to make the pseudoscopically positioned strips of the set projected thereon appear as strips stereoscopically positioned.

8. In a system for producing images in stereoscopic relief, means comprising a projection lens for projecting an image of a pseudoscopic parallax panoramagram, and a screen upon which said image is projected so constructed and arranged as to form a virtual image of said projection lens for each elemental panorama of said image.

9. In a system for producing pictures in stereoscopic relief, means comprising a projection lens for projecting an image of a pseudoscopic parallax panoramagram, a screen on which said image is projected, and means embodied in said screen at each elemental portion of said image, light rays from which are necessary to be seen by an observer to constitute a visible picture of the object of which said pseudoscopic panoramagram is representative, each of said elemental portion means forming virtual images of said projection lens which virtual images are visible to an observer looking at the screen from each of a plurality of positions on the viewing side of said screen transverse thereto and one of said virtual images formed by each of said means being simultaneously visible from each of said plurality of positions.

HERBERT E. IVES.

DISCLAIMER 1,970,311.—*Herbert E. Ives*, Montclair, N. J. PROJECTION OF IMAGES FOR VIEWING IN STEREOSCOPIC RELIEF. Patent dated August 14, 1934. Disclaimer filed October 30, 1935, by the assignee, *Bell Telephone Laboratories, Incorporated*.

Hereby enters this disclaimer to the said claims of said Letters Patent which are in the following words to wit:

"1. In a system for producing pictures in stereoscopic relief, means for projecting pseudoscopic strip images of an object, and means upon which the projected pseudoscopic strip images are received and made visible in stereoscopic relief.

"2. In a system for producing images for viewing in stereoscopic relief, means for projecting an image comprising sets of strips, each strip of a set corresponding to the appearance of an elemental portion of an object from a different point of view from that of another strip and the different sets representing different elemental portions, the strips of each set being pseudoscopically positioned, and means upon which said image is projected so constructed and arranged that an image of said object is made visible in stereoscopic relief.

"3. In a system for producing images for viewing in stereoscopic relief, means for projecting an image comprising sets of strips, each strip of a set corresponding to the appearance of an elemental portion of an object from a different point of view from that of another strip and the different sets representing different elemental portions, the strips of each set being pseudoscopically positioned, and a plurality of convex cylindrical mirror-like surfaces arranged side by side upon which said image is projected, the sets of strips registering with the convex surfaces respectively."

"5. In a system for producing images for viewing in stereoscopic relief, means for projecting an image comprising sets of strips, each strip of a set corresponding to the appearance of an elemental portion of an object from a different point of view from that of another strip and the different sets representing different elemental portions, the strips of each set being pseudoscopically positioned, a plurality of convex cylindrical mirror-like surfaces arranged side by side upon which said image is projected, the sets of strips registering with the convex surfaces respectively, and means to diffuse elemental portions of the projecting beam in planes parallel to the axes of the cylindrical surfaces."

"7. In a system for producing images for viewing in stereoscopic relief, means for projecting an image comprising sets of strips, each strip of a set corresponding to the appearance of an elemental portion of an object from a different point of view from that of another strip and the different sets representing different elemental portions, the strips of each set being pseudoscopically positioned, and means comprising a plurality of light deviating elements arranged side by side, upon which said image is projected, the sets of strips registering with said elements respectively and each element being so constructed and arranged as to make the pseudoscopically positioned strips of the set projected thereon appear as strips stereoscopically positioned.

"8. In a system for producing images in stereoscopic relief, means comprising a projection lens for projecting an image of a pseudoscopic parallax panoramagram, and a screen upon which said image is projected so constructed and arranged as to form a virtual image of said projection lens for each elemental panorama of said image.

"9. In a system for producing pictures in stereoscopic relief, means comprising a projection lens for projecting an image of a pseudoscopic parallax panoramagram, a screen on which said image is projected, and means embodied in said screen at each elemental portion of said image, light rays from which are necessary to be seen by an observer to constitute a visible picture of the object of which said pseudoscopic panoramagram is representative, each of said elemental portion means forming virtual images of said projection lens which virtual images are visible to an observer looking at the screen from each of a plurality of positions on the viewing side of said screen transverse thereto and one of said virtual images formed by each of said means being simultaneously visible from each of said plurality of positions."

[*Official Gazette November 19, 1935*.]